United States Patent
Gardner, Jr.

(10) Patent No.: US 6,656,596 B1
(45) Date of Patent: Dec. 2, 2003

(54) DECORATIVE AUTOMOTIVE INTERIOR TRIM ARTICLES WITH CAST INTEGRAL LIGHT STABLE COVERING AND PROCESS FOR MAKING THE SAME

(75) Inventor: John A. Gardner, Jr., Deerfield, NH (US)

(73) Assignee: Magna Interior Systems Inc., Aurora (CA)

( * ) Notice: Subject to any disclaimer, the term of this patent is extended or adjusted under 35 U.S.C. 154(b) by 0 days.

(21) Appl. No.: 09/447,413

(22) Filed: Nov. 23, 1999

Related U.S. Application Data

(62) Division of application No. 09/061,915, filed on Apr. 17, 1998, now Pat. No. 6,013,210.
(60) Provisional application No. 60/044,718, filed on Apr. 18, 1997, and provisional application No. 60/044,739, filed on Apr. 18, 1997.

(51) Int. Cl.$^7$ .............................. B32B 7/04; B32B 7/10; B32B 27/06; B32B 27/08; B32B 27/22; B32B 27/30; B32B 27/40
(52) U.S. Cl. ................. 428/423.1; 428/423.3; 428/424.2; 428/424.6; 428/500; 428/522
(58) Field of Search ......................... 428/423.1, 424.6, 428/172, 105, 141, 158, 161, 162, 163, 212, 217, 218, 423.3, 424.2, 500

(56) References Cited

U.S. PATENT DOCUMENTS

| | | |
|---|---|---|
| 1,889,905 A | 12/1932 | Seager |
| 4,195,148 A | 3/1980 | Hagen |
| 4,217,325 A | 8/1980 | Colby |
| T100,701 I4 | 6/1981 | Kuehn |

(List continued on next page.)

FOREIGN PATENT DOCUMENTS

| | | |
|---|---|---|
| EP | 0 379 246 | 7/1990 |
| EP | 0 392 285 | 10/1990 |

(List continued on next page.)

OTHER PUBLICATIONS

Patent Abstract of Japan, vol. 96, No. 7 Mar. 1996 re JP–08–071177.
"Elastogran France: Nouveau Pro_Ede Pour Les Panneaus De Portes", Ingenieurs De L'Automobile, No. 676, Oct. 1, 1992, p. 63.

*Primary Examiner*—Paul Thibodeau
*Assistant Examiner*—Nikolas J Uhlir
(74) *Attorney, Agent, or Firm*—Rader, Fishman & Grauer PLLC

(57) ABSTRACT

An article including a panel-like structure mountable in an automobile vehicle to form a part of the interior thereof, and a process for making the same are disclosed. According to this process, an outer layer defining at least a portion of the exposed exterior surface of the structure is prepared by applying a water-dispersed composition containing a thermoplastic polyurethane and a heat-activated crosslinking agent onto a mold surface and thereafter drying the composition. Next, a composition comprising (i) a poly(vinyl chloride) resin and at least one plasticizer and/or (ii) a thermoplastic polyurethane resin material is gelled onto an inner surface of the outer layer while on the outer layer is retained on the mold surface. The gelled composition is then fused to form an inner layer interfacially chemically bonded to the outer layer. The inner layer with the outer layer chemically bonded thereto is united with the rigid substrate so that the rigid substrate serves to reinforce the outer layer. The exposed exterior surface of the panel-like structure simulates the appearance and feel of authentic leather, while the inner layer and an optional semi-rigid polyurethane cellular foam intermediate layer provide a compressing feel to the exposed portion.

15 Claims, 7 Drawing Sheets

U.S. PATENT DOCUMENTS

| | | |
|---|---|---|
| 4,285,897 A | 8/1981 | Zakaria et al. |
| 4,294,880 A | 10/1981 | Nishida |
| 4,312,672 A | 1/1982 | Blahak et al. |
| 4,350,777 A | 9/1982 | Henrichs et al. |
| 4,520,042 A | 5/1985 | Smith |
| 4,592,887 A | 6/1986 | Bando et al. |
| 4,621,995 A | 11/1986 | Wersosky |
| 4,623,503 A | 11/1986 | Anestis et al. |
| 4,668,460 A | 5/1987 | Ongena |
| 4,810,452 A | 3/1989 | Taillfert et al. ............ 264/46.4 |
| 4,822,549 A | 4/1989 | Verwilst et al. |
| 4,825,974 A | 5/1989 | Hoffmann et al. |
| 4,923,657 A | 5/1990 | Gembinski et al. |
| 5,051,310 A | 9/1991 | Horn et al. .............. 428/423.3 |
| 5,071,683 A | 12/1991 | Verwilst et al. |
| 5,082,609 A | 1/1992 | Rohrlach et al. |
| 5,115,048 A | 5/1992 | Maeda et al. |
| 5,130,402 A | 7/1992 | Akiyama et al. |
| 5,154,871 A | 10/1992 | Wagner et al. |
| 5,207,961 A | 5/1993 | Wank et al. |
| 5,223,193 A | 6/1993 | Bianchin et al. |
| 5,242,738 A * | 9/1993 | Furuya et al. .............. 428/172 |
| 5,284,918 A | 2/1994 | Huynh-Tran et al. |
| 5,338,788 A | 8/1994 | Miyataka et al. |
| 5,387,390 A | 2/1995 | Kornylo |
| 5,387,750 A | 2/1995 | Chiang |
| 5,397,409 A | 3/1995 | Kornylo |
| 5,401,449 A | 3/1995 | Hill et al. .................. 264/46.4 |
| 5,411,688 A | 5/1995 | Morrison et al. .......... 264/45.4 |
| 5,523,337 A | 6/1996 | Banerjee et al. |
| 5,580,501 A | 12/1996 | Gallagher et al. |
| 5,656,677 A | 8/1997 | Jourquin et al. |
| 5,662,996 A | 9/1997 | Jourquin et al. |
| 5,885,662 A | 3/1999 | Gardner, Jr. |

FOREIGN PATENT DOCUMENTS

| | | |
|---|---|---|
| EP | 0 425 240 | 5/1991 |
| EP | 0 425 240 A2 | 5/1991 |
| EP | 39 38 082 | 5/1991 |
| EP | 0 744 264 | 11/1996 |
| GB | 2 079 667 | 1/1982 |
| SU | 383 608 | 3/1973 |
| WO | 880 087 | 2/1988 |
| WO | 93/23237 | 11/1993 |
| WO | 9 323 237 | 11/1993 |
| WO | 9 510 633 | 4/1995 |
| WO | 9 532 850 | 12/1995 |

* cited by examiner

US 6,656,596 B1

DECORATIVE AUTOMOTIVE INTERIOR TRIM ARTICLES WITH CAST INTEGRAL LIGHT STABLE COVERING AND PROCESS FOR MAKING THE SAME

This is a division of application Ser. No. 09/061,915, filed Apr. 17, 1998, now U.S. Pat. No. 6,013,210. Priority is claimed on Provisional Patent Applications 60/044,739 and 60/044,718 both filed Apr. 18, 1997, the complete disclosures of which are incorporated herein by reference.

BACKGROUND OF THE INVENTION

1. Field of Invention

The present invention relates to automotive interior trim articles containing a panel-like structure constructed to be mounted in an automobile vehicle to form a part of the interior thereof, and in particular to automobile interior trim articles such as instrument panels, door panels, and glove compartment doors. The present invention further relates to a process for making the aforementioned automotive interior trim articles.

2. Description of Related Art

Automotive interior trim articles such as instrument panels, door panels, armrests, headrests, floor consoles, knee bolsters, and glove compartment doors conventionally have been constructed by applying a soft decorative covering over a rigid substrate mountable in an automobile vehicular body, with a cellular polyurethane padding interposed between the decorative covering and rigid substrate. A predetermined texture and color is usually provided to the decorative covering in an effort to simulate the appearance and feel of authentic leather.

The preparation of a self-supporting synthetic automotive interior trim article having a cast polymeric covering, such as a poly(vinyl chloride) ("PVC") covering is known in the art and disclosed in, for instance, U.S. Pat. Nos. 4,562,025, 4,621,995, 4,623,503, 4,923,657, and 5,484,273.

In accordance with these disclosures, slush-or rotational-cast PVC is produced by introducing a liquid plastisol or tumbling a dry PVC powder in a metal mold until the material is formed against a moderately heated mold surface in a gelled state. The gelled material is then fused by heating the material to its fusion temperature and thereafter cooling the material to provide the PVC-based covering in a thermoplastic solid state.

However, in the commercial environment it has been found that PVC coverings prepared in accordance with the conventional techniques set forth in these disclosures must include several chemical additives. These chemical additives are required for at least the following reasons: to ensure that the product has a cosmetically consistent appearance that ages uniformly in use; to protect the coverings from degradation due to excessive temperatures that the coverings encounter during manufacture and use; and to bind the ingredients of the covering in a sufficient manner so as to prevent non-uniform surface appearance due to molecular separation of volatile and migratory ingredients during fusion in manufacture and long term exposure at elevated temperatures, which are often experienced in normal use.

While these additives, which can include heat and ultraviolet light stabilizers and plasticizers, serve the above-mentioned benevolent functions, the additives also can deleteriously affect the appearance of the resultant covering. For example, during manufacture in the rotational casting process disclosed in these related art disclosures, it is not unusual for some of these chemical additives to build up and deposit on the tool surface. Such deposits can hinder the casted material from completely filling the interstices of the grained surface of the mold, thereby preventing the exterior surface of the covering from fully transcribing the grained configuration of the mold surface and causing localized gloss patches to appear on the covering surface. Uniform appearance of color and gloss during manufacture is, therefore, difficult to obtain on a consistent basis without frequent mold cleaning. However, the additional time required to periodically clean the mold surface after demolding of a covering is accompanied by a corresponding loss in productivity. Further, frequent cleaning of the mold surface can cause wear on the grained configuration and shorten the tooling life.

A need therefore exists to provide a process for making a panel-like structure containing a decorative covering with a casted layer, such as a PVC layer or thermoplastic polyurethane layer, in which the panel-like structure can be produced in a more efficient and cost effective manner, and in which the resulting panel-like structure has a high quality, uniform leather-like appearance, and improved grain definition and durability.

SUMMARY OF THE INVENTION

It is, therefore, an object of the present invention to solve the aforementioned problems associated with the related art as well as the need expressed above. In accordance with the principles of the present invention, this object is attained by providing a process for making a panel-like structure adaptable for mounting to an automobile vehicle to form a part of the interior thereof. The panel-like structure includes an outer layer defining an exterior surface of the structure, at least a portion of which outer layer is exposed to the vehicle interior, and a rigid substrate defining an interior surface of the structure. The substrate is hidden from the vehicle interior when the panel-like structure is mounted in the automobile vehicle.

According to one embodiment of this process, at least the following steps are performed to prepare the panel-like structure. First, a water-dispersed composition comprising at least one light-stable aliphatic thermoplastic polyurethane containing one or more pendent hydroxyl and/or carboxyl functional groups, a desired coloring agent, and a heat-activated reactive crosslinking monomer or agent is applied onto a heated mold surface shaped to define a corresponding configuration of the outer layer. The heat-activated reactive crosslinking monomer is preferably carbodiimide. The light-stable thermoplastic polyurethane and the heat-activated reactive crosslinking monomer are heated, preferably by pre-heating the mold surface, and reacted to crosslink the thermoplastic polyurethane via the reactive crosslinking monomer. Second, the water-dispersed composition is substantially dried while on the mold surface to form the exposed outer layer with an exterior surface, at least a portion of which has the desired touch, color, and configuration of the panel-like structure. Third, a composition comprising at least one of (i) a poly(vinyl chloride) ("PVC") resin material and at least one suitable plasticizer and (ii) a thermoplastic polyurethane resin material having, for example, at least one ethylenically unsaturated bond in its backbone and suitable additives, is cast against an inner surface of the outer layer while on the mold surface to form an inner layer. In the case of plasticized PVC, the plasticized PVC preferably is cast by gelling and fusing in such a manner that the plasticizer of the plasticized PVC is crosslinked with the polyurethane of the outer layer via unreacted functional groups of the heat-activated reactive crosslinking monomer in the outer layer. In the case of thermoplastic polyurethane resin, it is preferably cast by gelling and fusing in such a manner that unreacted functional groups of the heat-activated reactive crosslinking monomer of the outer layer react with ethylenically unsaturated bonds and/or hydroxyl groups of the thermoplastic polyurethane to crosslink the polyurethane of the inner layer with the polyurethane of the outer layer. Consequently, interfacial chemical bonding is obtained between the inner surface of the outer layer and an adjacent surface of the inner layer during the casting and subsequent cooling steps. Fourth, the inner layer with the outer layer interfacially chemically bonded thereto is united with a rigid substrate so that the rigid substrate serves to reinforce the outer layer. Optionally, a soft cellular polyurethane foam layer can be formed intermediate the inner layer and the rigid substrate. Consequently, the panel-like structure retains the touch and color of the exposed portion and the compressing feel provided to the outer layer by the inner layer and the optional soft cellular foam intermediate layer.

Another object of the present invention is the provision of an automotive interior trim article containing a panel-like structure made by the method of the present invention, and in particular the provision of a panel-like structure having an exterior surface which simulates the appearance and feel of authentic leather.

In accordance with the principles of the present invention, this object is achieved by providing an article comprising a panel-like structure adaptable to be mounted in an automobile vehicle to form a part of the interior thereof. The panel-like structure has an exterior surface exposed to the vehicle interior and an interior surface which is hidden from the vehicle interior when the panel-like structure is mounted to the automobile vehicle structure. The panel-like structure comprises a rigid substrate and layered composition structure. The rigid substrate has one surface defining the interior surface of the panel-like structure, and an opposite surface which is united with the layered composite structure. The layered composite structure comprises an outer layer and an inner layer. The outer layer defines at least a portion of the exposed exterior surface of the panel-like structure, and has the desired touch, color, and configuration of the panel-like structure, as well as exhibiting good chemical resistance. The outer layer comprises a substantially dried, light-stable, crosslinked polyurethane formulated from a water-dispersed composition comprising at least one desired coloring agent, at least one light-stable aliphatic thermoplastic polyurethane containing one or more pendent hydroxyl and/or carboxyl functional groups, and a heat-activated reactive crosslinking monomer or agent. The heat-activated reactive crosslinking monomer is preferably carbodiimide. The light-stable aliphatic thermoplastic polyurethane and the heat-activated reactive crosslinking monomer are heated to thereby produce a crosslinking reaction and molded on a heated mold surface shaped to define a corresponding configuration of the outer layer, and then are dried on the mold surface. The inner layer, which is thicker than the outer layer, comprises at least one of (i) a plasticized PVC formulated from a composition comprising PVC resin and at least one plasticizer and (ii) a polyurethane formulated from a thermoplastic polyurethane resin material having, for example, at least one ethylenically unsaturated bond in its backbone and/or pendant hydroxyl groups. In the case of the PVC resin and plasticizer, the heat-activated reactive crosslinking monomer serves to crosslink the plasticized PVC with the light-stable aliphatic polyurethane of the outer layer. In the case of the thermoplastic polyurethane resin material with an ethylenically unsaturated bond, the heat-activated reactive crosslinking monomer reacts with the ethylenically unsaturated bond and/or hydroxyl group(s) of the thermoplastic polyurethane resin material of the inner layer to crosslink the polyurethane of the inner layer with the light-stable aliphatic polyurethane of the outer layer. Consequently, the inner layer has a surface adjacent to and interfacially chemically bonded with an inner surface of the outer layer. The interfacial chemical bonds are formed by timely gelling and fusing the inner layer against the inner surface of the outer layer while the outer layer is retained on the mold surface. The rigid substrate serves to reinforce the outer layer while retaining the touch and color of the exposed portion and the compressing feel provided to the outer layer by the inner layer and an optional interposed soft cellular polyurethane foam.

The composite provided in accordance with this embodiment exhibits excellent chemical, scuff and mar resistance to external influences. Further, appropriate additives can be introduced into one or both layers of the composite to provide the composite with the non-reflective and low gloss surface appearance desired for such panel-like structures. Furthermore, both the inner and outer layers of the composite are characterized by excellent extensibility, such that the composite can withstand indentation and flexure during use without resulting in cracking in the outer layer over a wide temperature range, such as from −30° C. to 120° C.

The principles of the present invention enunciated above are applicable to all types of panel-like structures, but have particular applicability to instrument panels (also referred to as dashboards) and door panels. Moreover, the principles of the present invention are applicable to various types of vehicles, including passenger cars, trucks, vans, utility vehicles, and others.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWING

The accompanying drawings illustrate the present invention. In such drawings.

DESCRIPTION OF THE PREFERRED EMBODIMENTS

Figure 1:
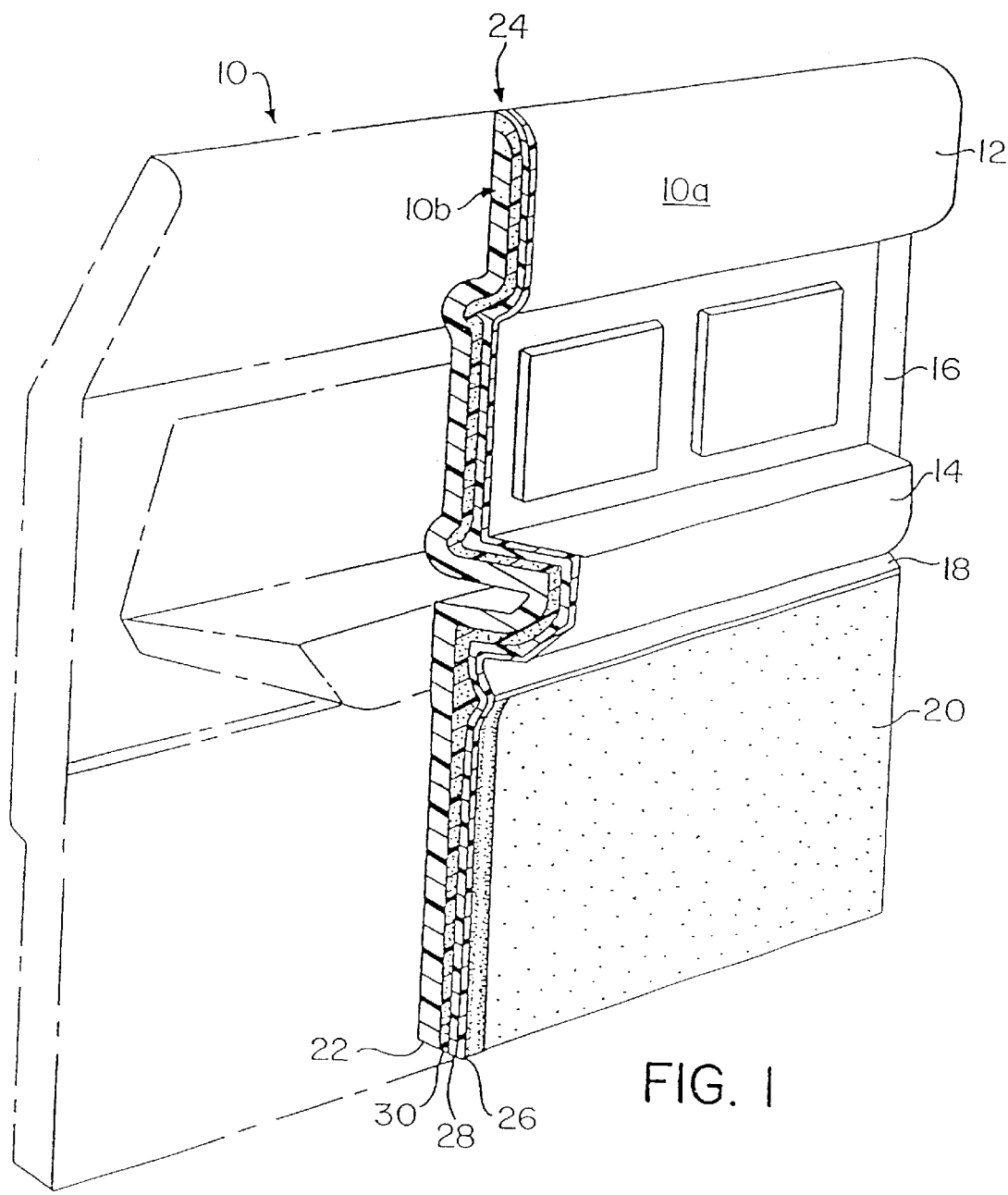
FIG. 1 is a perspective, partially sectioned and partially phantomed view of a completed vehicle door panel constructed in accordance with the present invention.

Referring now more particularly to the drawings, there is shown in FIG. 1 a panel-like structure comprising a vehicle door panel, generally designated by reference numeral 10, made by a method according to the principles of the present invention. The door panel 10 includes a window sill upper portion 12 and an arm rest portion 14 defining therebetween a bolster receiving portion 16. A lower planar rug receiving portion 18 having a rug section 20 connected thereto is disposed below the arm rest portion 14.

As shown in cross-section in FIG. 1, the panel-like structure 10 has an exterior surface 10a exposed to the vehicle interior and an interior surface 10b which is hidden from the vehicle interior when the panel-like structure 10 is mounted in the automobile vehicle. The panel-like structure 10 includes a rigid substrate 22 having one surface defining the interior surface 10b of the panel-like structure 10. The panel-like structure 10 further includes a layered composite structure, generally designated by reference numeral 24, comprising an outer layer 26 defining at least a portion of the exposed exterior surface 10a of the panel-like structure 10 and an inner layer 28. At least a portion of the outer layer 26 is exposed to the vehicle interior, while a portion of the outer layer may be hidden from view by a decorative or other masking item. For example, in FIG. 1, the lower planar rug receiving portion 18 of the outer layer 26 is covered by the rug section 20 and, therefore, is not exposed to the vehicle interior.

As illustrated in FIG. 1, the inner layer 28, which is relatively thick in comparison to the outer layer 26, has an outer surface 28a adjacent to and interfacially chemically bonded with an inner surface 26b of the outer layer 26. As further illustrated in FIG. 1, the rigid substrate 22, which is hidden from the vehicle interior when the panel-like structure 10 is mounted in the automobile vehicle, reinforces the outer and inner layers 26 and 28. Finally, an intermediate layer 30 comprising a relatively rigid (or semi-rigid) polyurethane cellular foam filler is interposed between the inner layer 28 and the rigid substrate 22.

Figure 4:
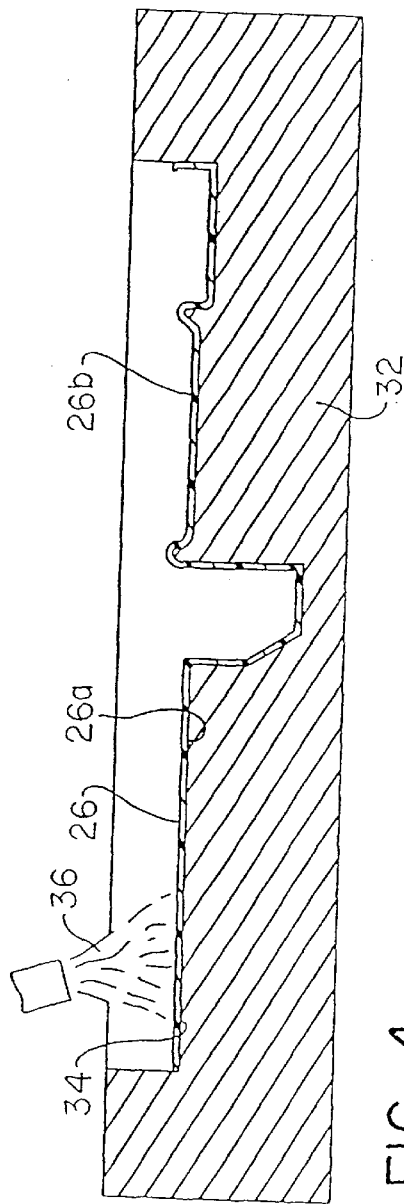
FIG. 4 is a sectional view of a mold surface showing a step of applying a water-dispersed polyurethane composition to the mold surface while heated to form a crosslinked light-stable polyurethane outer layer in accordance with the present invention.

As shown in FIG. 4, the method of the present invention utilizes a first mold component or part 32 having a first mold surface 34. The first mold component 32 preferably is formulated by electrolytically depositing nickel over a rigid cast epoxy substrate which is secondarily removed at the end of the deposition/plating process to yield a self-supporting mold capable of being mounted and controlled in a tooling module. The first mold surface 34 is shaped to define a configuration that substantially corresponds to the desired configuration of the outer layer 26, and is grained to define a texture that substantially complements the desired texture of the outer layer 26 and simulates real leather.

FIG. 4 illustrates the first step in the present invention and, in accordance with this step, the outer layer 26 is obtained by applying, preferably by spraying, a water-dispersed composition 36 onto the first mold surface 34. The water-dispersed composition comprises at least one light-stable aliphatic thermoplastic polyurethane containing one or more pendent hydroxyl and/or carboxyl functional groups, at least one desired coloring agent, and at least one heat-activated reactive crosslinking monomer or agent. Carbodiimide (H—N=C=N—H), also known as cyanamide, preferably serves as the heat-activated reactive crosslinking monomer. Other suitable crosslinking monomers, such as aziridine, can also be used.

Application of the water-dispersed composition 36 onto the heated first mold surface 34 induces chemical reaction between the one or more pendent hydroxyl and/or carboxyl functional groups of the light-stable thermoplastic polyurethane and the heat-activated reactive crosslinking monomer to thereby produce a crosslinked light-stable polyurethane. The first mold surface 34 should be heated to a sufficient temperature to drive the crosslinking reaction, but should not be so high as to cause delamination of the composition 36 from the mold surface 34. Preferably, the first mold surface 34 is heated to a temperature in a range of from about 140° F. (60° C.) to about 160° F. (71.1° C.). The heating of the first mold surface 34 to such elevated temperatures prior to application of the water-dispersed composition 36 thereto also serves to melt and disperse semi-permanent mold releasing agents, such as microcrystalline wax mold releasing agents, applied to the first mold surface 34. The heated mold surface thereby evaporates the wax dispersants and leaves a thin residue that does not collect in the intricate grain detail of the first mold surface 34.

The water-dispersed composition 36 can be prepared by withdrawing the light-stable aliphatic thermoplastic polyurethane and the heat-activated reactive crosslinking monomer from separate storage chambers in continuous, metered streams, and mixing these constituents immediately prior to contact with the first mold surface 34. Alternatively, the light-stable aliphatic thermoplastic polyurethane and the carbodiimide constituents can be stably premixed, or "hot-potted", for up to about 24 hours at room temperature before application. This technique is known as "hot-potting" since the thermoplastic polyurethane and carbodiimide slowly react with each other at room temperature in a spray pressure pot. If the admixture is hot-potted for more than about 24 hours at room temperature before application onto the first mold surface 34, the resulting crosslinked light-stable polyurethane exhibits inferior solvent and wear resistance properties and extensibility and may not provide an idealized bond to the inner layer 28.

Figure 5:
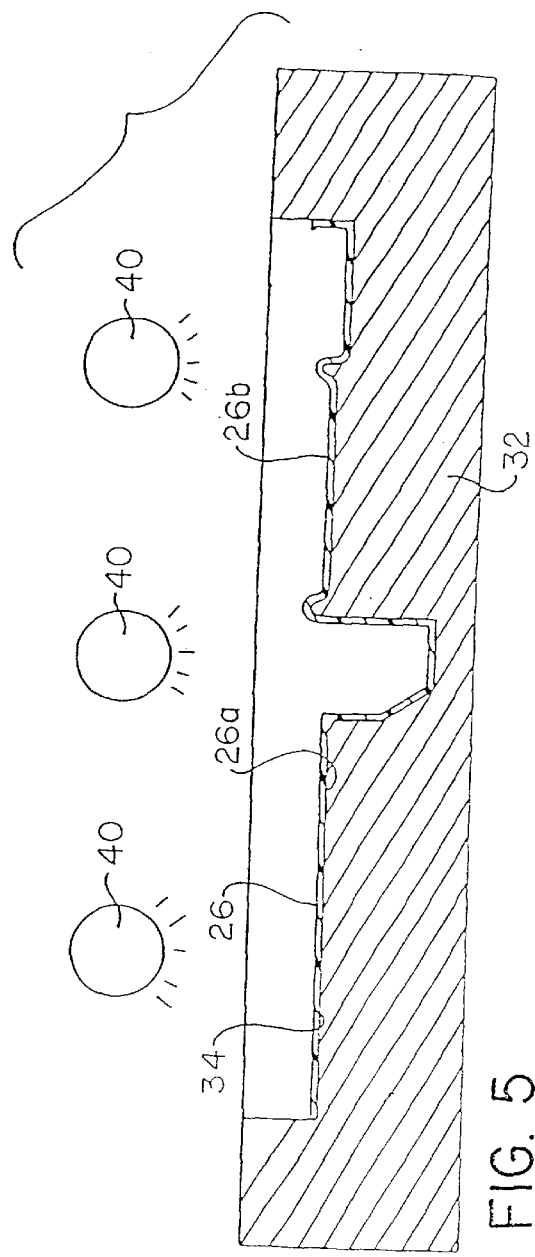
FIG. 5 is a sectional view similar to FIG. 4 showing a step of drying the polyurethane outer layer.

Once the crosslinked light-stable polyurethane has been formed on the first mold surface 34, it is substantially dried while being retained on the first mold surface 34 to obtain the outer layer 26. As shown in FIG. 5, the crosslinked light-stable polyurethane can be subjected to a heat source 40 to induce evaporation of the water and solvent therefrom and form the outer layer 26 with an outer surface 26a adjacent to the first mold surface 34. Although not shown in FIG. 5, such heat source 40 is preferably integrated with the first mold 32, and preferably heats the first mold surface 34 to an elevated temperature of about 150° F. (65.6° C.) or higher. At least a portion of the outer surface 26a of the outer layer 26 has the desired touch, color, and grain-like configuration of the panel-like structure 10.

Generally, the outer layer 26 has a thickness in a range of from about 1.0 mils to about 1.5 mils (that is, from about 0.001 inch to about 0.0015 inch; or from about 0.0025 cm to about 0.0038 cm). The particular coloring agent selected can directly influence the desired thickness of the outer layer 26. Darker colors, such as grays and greens, usually only require a relatively small film thickness to mask the color of the hidden inner layer 28, whereas lighter colors such as reds and yellows usually dictate the provision of a relatively larger thickness to obtain an opaque, non-transparent outer layer 26 that conceals the inner layer 28 from view.

Figure 6:
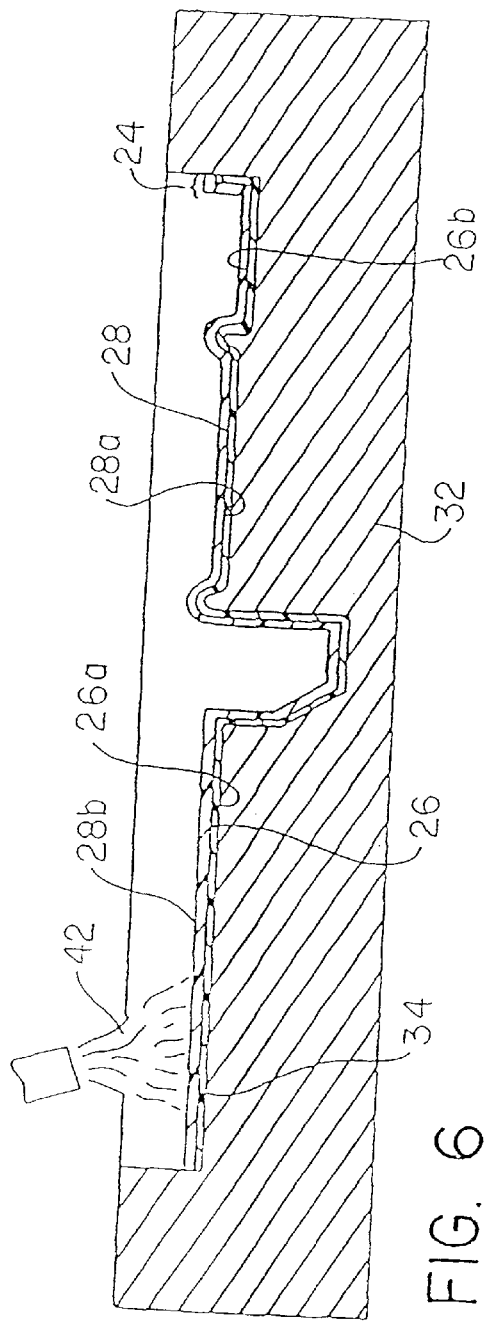
FIG. 6 is a sectional view similar to FIG. 5 showing a second composition gelled and fused against an inner surface of the outer layer while the outer layer is retained on the mold surface to form an inner layer.

Next, the inner layer 28 is formed from a composition 42 comprising at least one of (i) a poly(vinyl chloride) ("PVC") resin material and at least one suitable plasticizer and (ii) a thermoplastic polyurethane resin material having, for example, at least one ethylenically unsaturated bond in its backbone and suitable additives. The composition 42 is gelled against the inner surface 26b of the outer layer 26 while the outer layer 26 is retained on the first mold surface 34 in a substantially dry state. The gelled composition 42 is then fused to form the inner layer 28 disposed on and interfacially chemically bonded to the outer layer 26, as shown in FIG. 6. The composition 42 also can include additives, as desired or needed.

Figure 7:
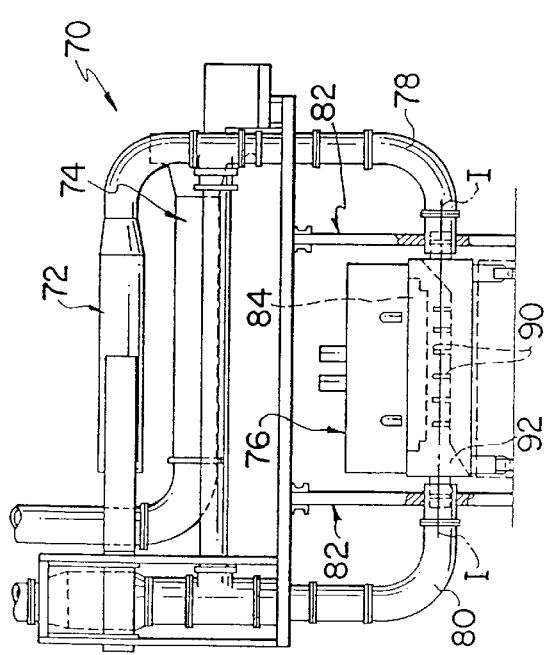
FIG. 7 is a schematic view of an assembly suitable for performing the gelling and fusing steps of the present invention.

The composition 42 can be cast by employing an assembly such as that illustrated in FIG. 7 and generally designated by reference numeral 70. As shown in FIG. 7, the illustrated assembly 70 includes a hot air supplying system 72 and a cool air supplying system 74, each of which is equipped with a blower (not shown). The hot and cool air supplying systems 72 and 74 are each fluidly connected to a module unit 76 via an air inlet conduit 78 and an air outlet conduit 80. Valves (not shown) can be provided for controlling the amount of hot and cool air provided to the module unit 76 by the hot and cool air supplying systems 72 and 74, respectively. Suitable valving systems are known in the art, and an example of such a valving system is described in U.S. Pat. No. 4,623,503.

The module unit 76 is rotatably supported about axis I—I by a stationary base 82. Suitable drive means (not shown) for rotating the module unit 76 are set forth in U.S. Pat. No. 4,217,325.

Figure 8:
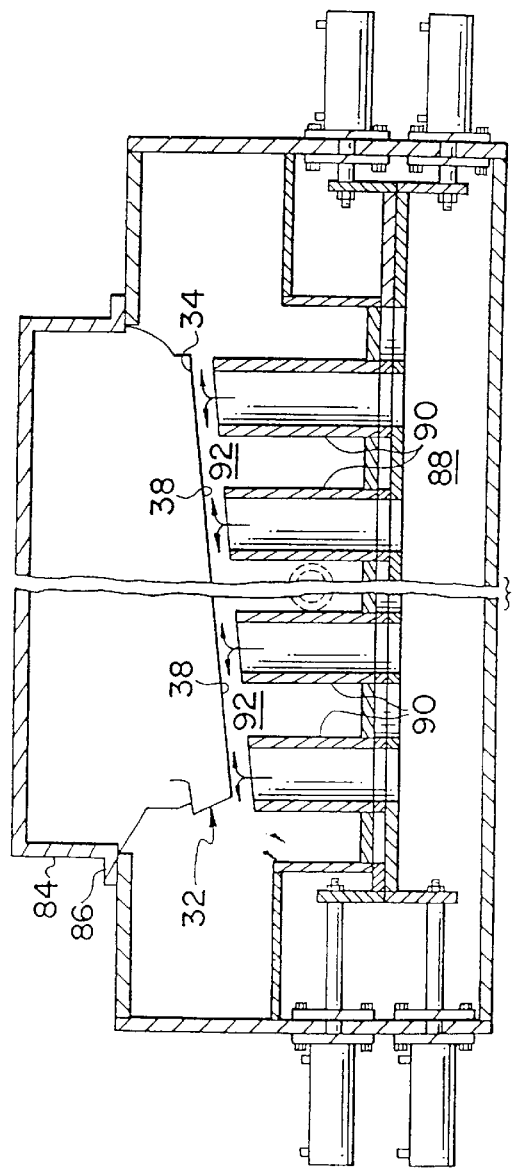
FIG. 8 is an enlarged view of a portion of the assembly illustrated in FIG. 7.

As shown in more detail in FIG. 8, the rotatable module unit 76 includes a powder box 84 which is configured to cover and seal at least the portion of the first mold surface 34 retaining the outer layer 26. The interior of the powder box 84 can be supplied with a charge of the composition 42 before bringing the box 84 into sealing engagement with the first mold component 32 to define a closed system.

The air inlet conduit 78 is fluidly connected to an inlet plenum 88, which in turn is in fluid connection with one or more sets of air impingement nozzles 90. The air impingement nozzles 90 are disposed adjacent an opposing surface 38 of the first mold component 32. Each nozzle 90 contains a passage terminating in an opening. The air impingement nozzles 90 are generally constructed and arranged to receive air introduced into the inlet plenum 88 via air inlet conduit 78 and to distribute and discharge the air over a desired portion of the opposing mold surface 38 of the first mold component 32. An air outlet plenum 92 is provided for collecting air expelled from the air impingement nozzles 90 (after the air impacts the opposing mold surface 38) and conveying the air to the air outlet conduit 80.

In operation, a form of rotational casting, such as a fill, coat and dump process, can be employed. In accordance with this casting technique, the process involves rotating the module unit 76, including the powder box 84, about axis I—I. When the module unit 76 is rotated into an inverted position as shown in FIG. 8, the composition 42 is gravitationally transferred from the powder box 84 and onto the outer layer 26, which is retained on the first mold surface 34. A portion of the composition 42 is gelled against the outer layer 26, which has previously been heated to dry the outer layer 26, as described above. The composition 42 is preferably gelled against the inner surface 26a of the outer layer 26 at a temperature hot enough to gel the portion of the composition 42 in contact with the outer layer 26. For example, the temperature for gelling can be in a range of from about 160° F. (71° C.) to about 200° F. (93° C.). The powder box 84 is then returned to its original position so that the PVC composition 42 which has not adhered to the outer layer 26 gravitationally drops onto the retaining member 86 of the powder box 84. This process is repeated until a desired thickness of composition 42 has been gelled against the inner surface 26a of the outer layer 26. A resultant build-up of the gelled composition 42 having a substantially uniform thickness develops on the outer layer 26. After the build-up has reached a desired thickness, the powder box 84 can be disengaged from the first mold 32 so that the powder box 84 can be removed from the module unit 76.

Thereafter, the gelled composition 42 is fused in accordance with known practice. Fusing can be performed, for example, by heating the first mold 32 to a temperature of about 400° F. (204.4° C.) or more. The fused composition 42 is thereafter cooled to provide the inner layer 28 comprising a plasticized flexible thermoplastic PVC and/or a polyurethane.

The heat necessary for the gelling and fusing steps is provided by the hot air supplying system 72 and is introduced into the module unit 76 via air inlet conduit 78. The hot air is forced through the inlet plenum 88 and the injection nozzles 90, and impacts against the opposing mold surface 38 of the first mold component 32, thereby transferring heat through the first mold component 32 and heating the outer layer 26 disposed on the first mold surface 34 of mold component 32. The air is removed from the module unit 76 through the outlet plenum 92 and air outlet conduit 80, and thereafter can be recycled to the hot air supplying system 72 for reheating.

After the gelling and fusing steps are completed, the valving system can be activated to disconnect the hot air supplying system 72 and connect the cool air supplying system 74. Cool air can then be supplied to the module unit 76 and impacted against the opposing mold surface 38 to cool the outer and inner layers 26 and 28.

The air flow rate, air temperature, nozzle diameters and spacing, distance between the nozzles and opposing mold surface 38, and similar process variables can each be manipulated to produce desired heating and cooling transfer effects. Suitable means for controlling these variables are known in the art and are disclosed, for example, in U.S. Pat. No. 4,621,995.

Although the present invention is not intended to be limited by any theory, interfacial chemical bonding between the inner and outer layers 26 and 28 can be attained as follows.

In the case where the composition 42 for preparing the inner layer 28 comprises a PVC resin material, the composition 42 further comprises at least one suitable plasticizer. In addition to being reactive with the PVC constituent of the inner layer 28, the plasticizer of the composition 42 can contain one or more pendent functional groups, such as hydroxyl and/or carboxyl functional groups, that are highly reactive with unreacted functional groups of carbodiimide in the outer layer 26 that have not reacted with the pendent functional groups of the polyurethane of the outer layer 26. Unreacted functional groups of the carbodiimide penetrate into the inner layer 28 and react with the pendent functional groups of the plasticizer during casting. As a result, the carbodiimide crosslinks the polyurethane of the outer layer 26 with the plasticizer of the PVC composition 42 and thereby forms interfacial chemical bonding between the inner surface 26b of the outer layer 26 and the adjacent outer surface 28a of the inner layer 28. The layered composite structure 24 is thus obtained.

In the case where the composition 42 for preparing the inner layer 28 comprises a thermoplastic polyurethane, the thermoplastic polyurethane of the inner layer 28 can contain one or more ethylenically unsaturated bonds in its backbone that are highly reactive with unreacted functional groups of carbodiimide in the outer layer 26 that have not reacted with the pendent functional groups of the polyurethane of the outer layer 26. Unreacted functional groups of the carbodiimide penetrate into the inner layer 28 and react with the ethylenically unsaturated bonds of the composition 42. Additionally or in the alternative, excess polyols can also be provided in forming the polyurethane of the outer layer 26, allowing the penetrated carbodiimide to react with the hydroxyl groups of the polyols. As a result, the carbodiimide crosslinks the crosslinked polyurethane of the outer layer 26 with the thermoplastic polyurethane of the second composition 42 and thereby forms interfacial chemical bonding between the inner surface 26b of the outer layer 26 and the adjacent outer surface 28a of the inner layer 28. The layered composite structure 24 is thus obtained.

If the crosslinking is performed under optimum crosslinking conditions, the boundary between the outer and inner layers 26 and 28 of the layered composite structure 24 can become visually indistinct, such that a transition phase appears at the interface of the two layers. As referred to herein, interfacial chemical bonding encompasses, but is not limited to, such crosslinking reactions in which the interfacial boundary between the outer and inner layers 26 and 28 is visually indistinct and the layers 26 and 28 are inseparable.

Generally, provisions should be taken to ensure that adequate interfacial chemical bonding is achieved between the inner surface 26b of the outer layer 26 and the adjacent outer surface 28a of the inner layer 28. For example, once the carbodiimide is activated by heat, the crosslinking reaction between the carbodiimide and the pendent hydroxyl and/or carboxyl reactive groups of the thermoplastic polyurethane of the outer layer 26 goes to completion within minutes, leaving substantially no residual reactive sites in the carbodiimide for crosslinking the polyurethane of the outer layer 26 with the active groups of the composition 42. Therefore, the composition 42 generally should be gelled and fused within six minutes, and preferably within two to four minutes, of completing the application of the water-dispersed composition 36 to the first mold surface 34. Significant delays in casting the composition 42 also can cause the outer layer 26 to constrict and delaminate from the first mold surface 34. As a consequence of delamination, the outer layer 26 will not have a shape that corresponds to the configuration of the first mold surface 34, and the entire composite 24 will have to be disposed of as scrap.

Generally, the inner layer 28 has a thickness in a range of from about 40 mils to about 60 mils (that is, from about 0.040 inch to about 0.060 inch; or from about 0.10 cm to about 0.15 cm).

Figure 9:
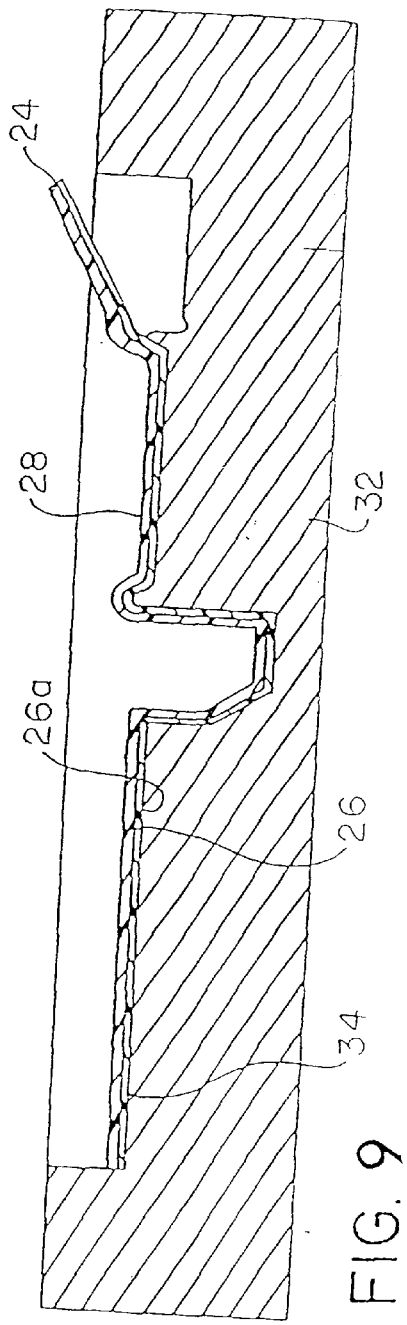
FIG. 9 is a sectional view similar to FIG. 6 showing a step of removing the combination of the inner and outer layers from the mold surface.

FIG. 9 illustrates the next step of the present invention. As shown in FIG. 9, the layered composite structure 24 is demolded (i.e., removed) from the first mold surface 34. Such demolding can take place at a mold temperature of, for example, about 140° F. (about 60° C.). The demolding process is often a relatively labor intensive, tedious, and time consuming task. Formation of tears in or undue stretching of the layered composite structure 24 during demolding can irreversibly ruin and thereby necessitate disposal of the layered composite structure 24 as scrap. Such demolding problems and inefficiencies are largely overcome by practice of the present invention, since the interfacial chemical bonding between the outer layer 26 and inner layer 28 strengthens the layered composite structure 24 by discouraging separation of the outer and inner layer 26 and 28 during demolding procedures.

To enhance the releasibility from the first mold surface 34 further, the mold surface 34 can be pretreated with a releasing agent. Exemplary releasing agents include, without limitation, high molecular weight microcrystalline wax mold releases, such as Chem-Trend PRC 7140, supplied by Chem-Trend, Inc. of Howell, Mich., or PRC 2006, also supplied by Chem-Trend. These mold releasing agents dry quickly on a heated mold within about 5 to about 10 seconds and form a release barrier between the grained mold surface 34 and the outer layer 26. Care should be taken to avoid the accumulation of the mold releasing agent on the first mold surface 34 or excess solids content in the agent, since such accumulation or excess solids content tends to fill the interstices of the decorative, grained mold surface 34, thereby removing from the exterior surface of the panel-like structure 10 the appearance of the intricate, hair-like grained configuration of the mold surface 34. Further, the use of excess mold releasing agents can cause the agents to transfer from the first mold surface 34 to the layered composite structure 24 during demolding of the composite structure 24, thus requiring additional wash-removal and drying steps after demolding and hence a loss in productivity.

After being demolded from the first mold surface 34, the layered composite structure 24, including the combination of the outer and inner layers 26 and 28, can be examined for defects with a light source (not shown) while the layered composite structure 24 is positioned on a transparent substrate (not shown). Such defects usually are present as cosmetic blemishes in the outer layer 26, and may include the presence of tears and rupturable portions lacking sufficient thicknesses to withstand stresses associated with demolding or the further processing steps, especially the uniting step. If minor and isolated, such localized defects can be remedied by post application of additional water-dispersed composition 36 onto the backside 28b of the inner layer 28. Additionally, minor tears or thin areas can be repaired using thermoplastic, heat formable polyurethane tape on the backside 28b of the layered composite structure 24. Advantageously, the need to scrap the entire layered composite structure 24 is thereby averted. As a cautionary note, however, post application spray repair of surface 26a is generally undesirable and its use should be minimized to correcting localized defects, since post application spray repair can negate the grained leather-like appearance of the outer surface 26a of the outer layer 26 which is transcribed from the first mold surface 34.

As discussed in further detail below, the steps of demolding and examining of the layered composite structure 24 from the first mold surface 34 are not required to be conducted immediately subsequent to the formation of the layered composition structure 24. For example, the layered composite structure 24 optionally can be maintained against the first mold surface 34 until completion of the panel-like structure 10.

Figure 10:
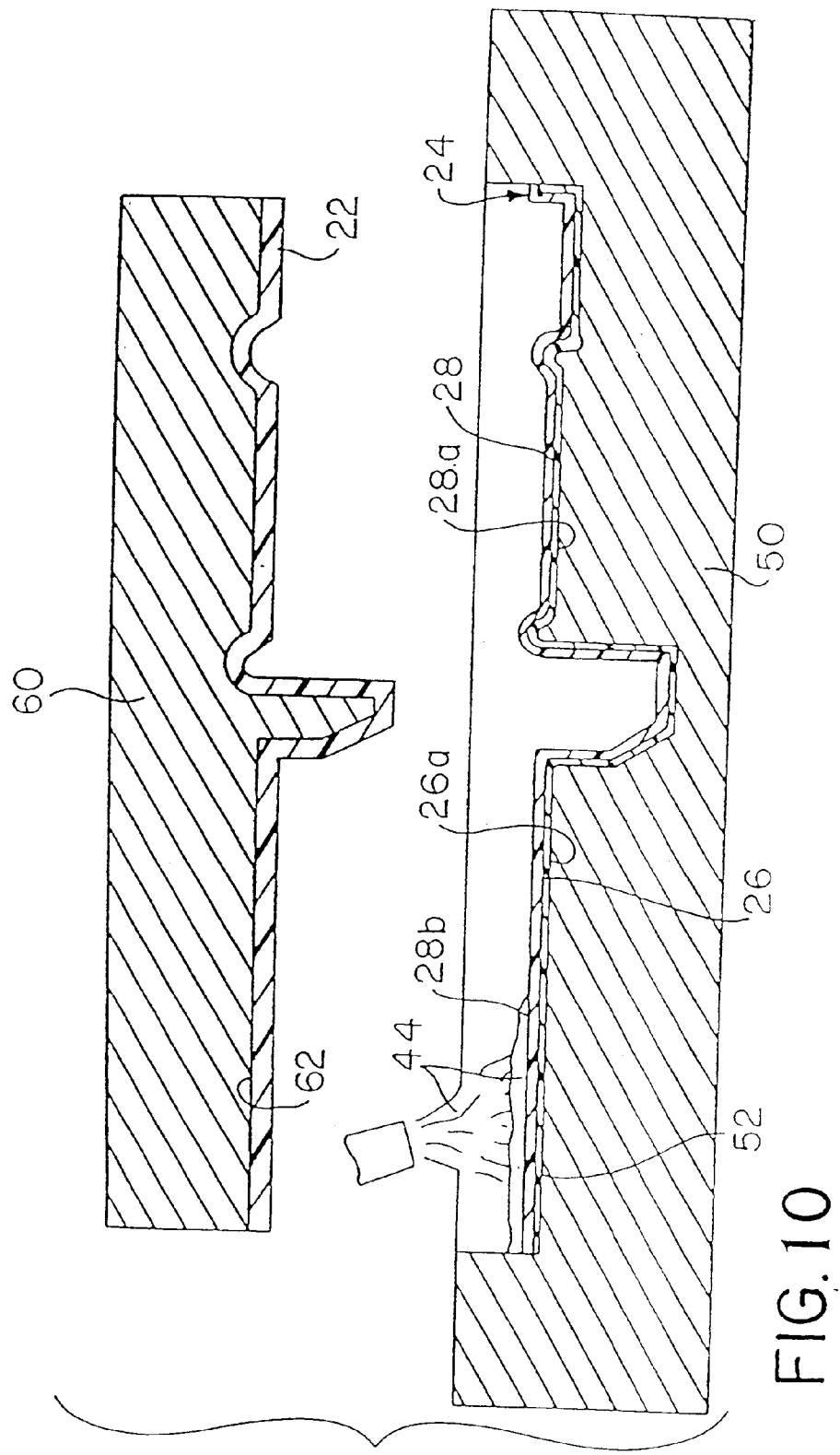
FIG. 10 is a sectional view of a second mold surface showing a step of obtaining a relatively rigid polyurethane cellular foam intermediate layer by applying a reaction mixture to the inner layer while the combination of the inner and outer layers are disposed on a second mold surface in accordance with an embodiment of the method of the present invention.

After the layered composite structure 24 is demolded from the first mold surface 34 and examined, the layered composite structure 24 is placed on a second mold surface 52 of a second mold part 50. As shown in FIG. 10, the second mold surface 52 also is shaped to define a corresponding configuration of the outer layer 26. Then, a reactive mixture 44 for forming a semi-rigid cellular foam, such as a polyurethane semi-rigid cellular foam, is applied to an inner surface 28b of the inner layer 28 while the composite structure 24 is disposed on the second mold surface 52 to form the intermediate layer 30. The reactive mixture 44 can be applied, for instance, by employing high impingement mixing and a mix-head nozzle. The second mold component 50 is generally heated to a temperature in a range of from about 35° C. to about 45° C., and more preferably in a range of from about 35° C. to about 40° C., during application of the reactive mixture 44. The mixture 44, which is typically relatively viscous, is in a transient state of reaction during application to the second mold component 50 and begins to foam within seconds of application.

Although the desired thickness of the intermediate layer is partially dependent upon the intended use of the panel-like structure 10, generally the intermediate layer can have a thickness in a range of from about 5 mm to about 12 mm.

Figure 11:
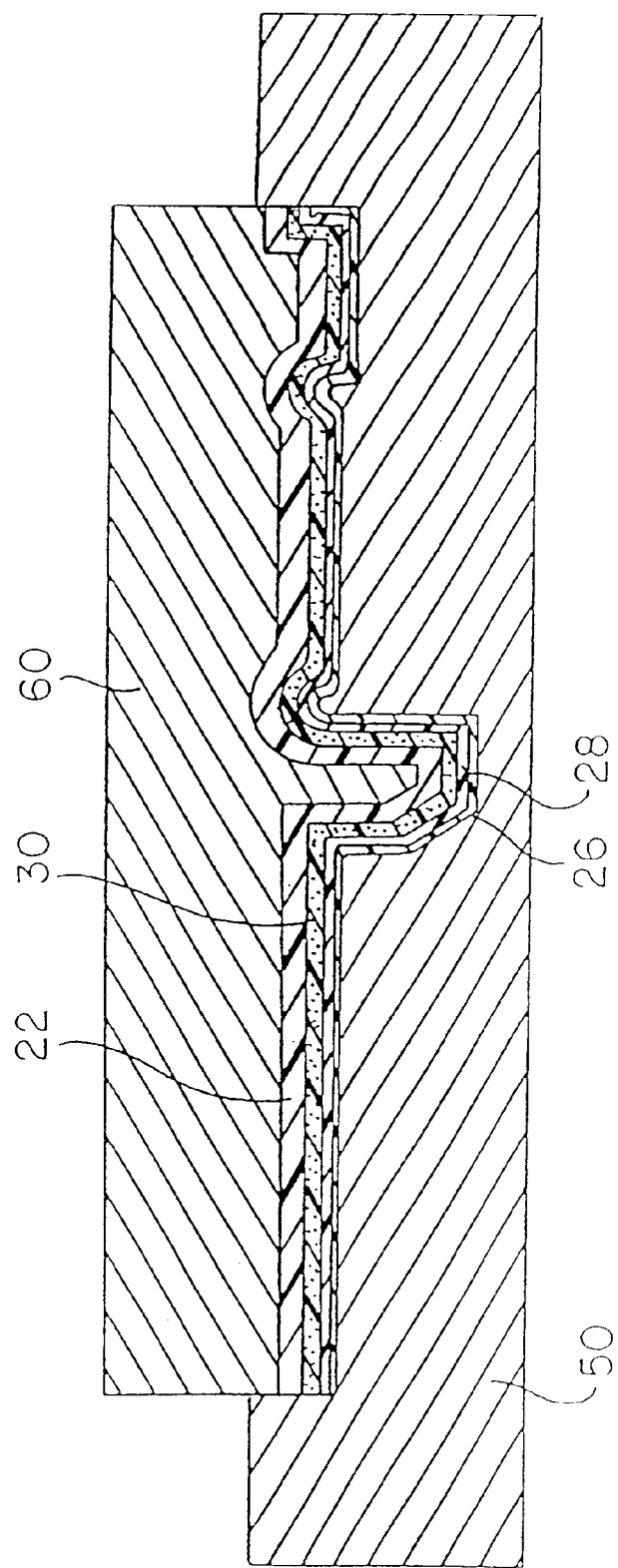
FIG. 11 is a sectional view showing a step of uniting the combination of the inner and outer layers on the second mold surface with a pre-formed relatively rigid substrate disposed on a third mold surface.

Once the reactive mixture 44 has been applied to the layered composite structure 24 located on the second mold surface 52, a third cooperating mold part or component 60 carrying the pre-formed rigid substrate 22 is moved into cooperating relation with the second mold component 50, as shown in FIG. 11. The third mold component 60 has a third mold surface 62 (FIG. 10) which is shaped to define the interior surface 10b of the panel-like structure 10. Thereafter, the reactive mixture 44 is foamed and cured, preferably under heat of approximately 110° F. (43.3° C.) and a self-generated cavity pressure of about 0.8 atm to form the intermediate layer 30. The semi-rigid polyurethane cellular foam serves to unite the layered composite structure 24 with the pre-formed rigid substrate 22 disposed on a third mold surface 62. The panel-like structure including the combination of the layered composite structure 24, the rigid substrate 22, and the intermediate layer 30 then can be removed from the mold parts 50 and 60 and additional components, such as the rug section 20, can be affixed.

In its broadest aspects, several variations and modifications to the above-discussed article can be implemented without departing from the scope of the present invention. For example, the layered composite structure 24 and/or the intermediate layer 30 can be eliminated from the hidden lower planar rug receiving portion 18 (or other portions that are hidden from the vehicle interior when the panel-like structure is mounted in the automobile vehicle) of the resultant panel-like structure 10 depicted in FIG. 1 so that the lower planar rug receiving portion 18 is characterized by having the rigid substrate 22 directly adjacent to the rug section 20.

According to another variant embodiment of the present invention, a non-foamable adhesive can be selected for uniting the layered composite structure 24 to the rigid substrate 22.

In accordance with yet another variant embodiment, multiple water-dispersed compositions containing different coloring agents can be respectively applied to different portions of the panel-like structure to produce discretely masked colors. Where the selected color or colors are to be changed, in practice it has been found that minimal downtime (on the order of about 0.5 hours) is required.

In accordance with still another variant embodiment, the outer layer 26 can exhibit a dualtone or multitone appearance. This variant embodiment can be accomplished, for example, by abrasive treatment of a portion of the mold surface of the tooling. The greater the amount of abrasive treatment, the duller the appearance of the outer layer 26. A dualtone appearance can be especially desirable for instrument panels, since the upper lie region of an instrument panel generally should have a low gloss in order to reduce reflectance and veiling glare.

Several variations and modifications to the above-discussed method also can be practiced without departing from the scope of the present invention. For example, as mentioned above, the layered composite structure 24 can be retained in the first mold component 32 instead of being demolded and transferred to a second mold component 50 for the uniting step. In accordance with another variant embodiment of the present invention, the layered composite structure 24 can be returned to the first mold component 32 after being examined and treated.

In accordance with another variant of the present invention, a secondary or alternative heat source can be applied for activating the reaction between the light-stable aliphatic thermoplastic polyurethane and the heat-activated reactive crosslinking monomer. For example, the water-dispersed composition 36 can be preheated before being applied to the first mold surface 34, such that the first mold surface 34 does not have to be heated to initiate the reaction between the heat-activated reactive crosslinking monomer and the light-stable aliphatic thermoplastic polyurethane.

In accordance with yet another variant embodiment of the present invention, techniques other than casting of dry powder material can be employed for applying and fusing the composition 42 to the outer layer 26 to form the inner layer 28. For example, the dry powder material can be replaced with pellets or other suitable forms of material. In addition, in the case where the composition 42 comprises a PVC resin material, the composition 42 can be in the form of a plastisol, such that a slush casting method, such as the inverted bath tub method, fill and dump method, or another method known in the art can be employed.

The above-illustrated embodiment of the present invention can also be modified by applying the reactive mixture 44 for forming the polyurethane semi-rigid cellular foam 30 to the surface of the rigid substrate 22 instead of the layered composite structure 24. Alternatively, the second and third mold components 50 and 60 can be cooperatively engaged to define a cavity between the inner surface 28b of the inner layer 28 and the outer surface of the substrate 22, with the reactive mixture 44 thereafter being injected between the rigid substrate 22 and the composite 24.

In order to further elucidate the decorative automotive interior trim article and method of the present invention, the following discussion specifies suitable and preferred constituents and conditions for making the article of the present invention and for carrying out the process of the present invention.

The water-dispersed composition 36 used to prepare the outer layer 26 comprises at least one light-stable aliphatic thermoplastic polyurethane, at least one desired coloring agent, and at least one reactive crosslinking monomer. The light-stable aliphatic thermoplastic polyurethane is preferably prepared from a high molecular weight aliphatic thermoplastic polyurethane containing hydroxyl and/or carboxyl pendent functional groups which are chemically reactive with the carbodiimide. The average molecular weight of the thermoplastic polyurethane can be in a range of from about 5000 to about 7000 and more preferably about 6000. An exemplary water dispersed composition containing a thermoplastic polyurethane and carbodiimide can be obtained from C. F. Jameson & Company, Inc. of Bradford, Mass. under the trade designation JAMESON WVF SERIES FLEXCOAT IMC. The desired weight ratio of thermoplastic polyurethane to carbodiimide for this particular composition is about 8 to 1 by volume (equivalent ratio of 1.44 thermoplastic polyurethane to 1.08 carbodiimide on a dry basis).

The water-dispersed composition 36 can be prepared by providing the thermoplastic polyurethane component as a colloidal solution in a solvent such as N-methyl pyrrolidone, then dispersing the solution by adding water, the coloring agent, and conventional additives, if desired. Sufficient water can be added so that the solvent concentration in the water-dispersed composition 36 is about 13.9% by weight, and about 35% by weight after drying.

The optional additives in the water-dispersed composition 36 can include, without limitation, any combination of the following: heat and ultra-violet light stabilizers, pH stabilizers to maintain an alkaline state of dispersion, plasticizers, antioxidants, dulling agents, surfactants, colloidal protectants to maintain particles in suspension, carbon black, thixotropic agents (e.g., hydroxy methyl cellulose), and fillers such as clay particles.

The water-dispersed composition 36 can contain, for example, about 20% to about 30% solids by weight, and more preferably about 24% solids by weight, about 10% to about 80% water by weight, and more preferably about 50% water by weight, and about 9 to 15% solvents by weight, depending on desired color and additives. An insufficient amount of water in the composition 36 can adversely affect the viscosity of the composition 36 and thus adversely affect the application of the water-dispersed composition 36 onto the mold surface 34. On the other hand, an excess amount of water in the composition 36 can significantly alter the sprayability and coating efficiency of the water-dispersed composition 36 to prolong the time needed to dry the outer layer 26.

The water-dispersed composition 36 can be prepared by adding to the thermoplastic polyurethane solution a solution comprising the carbodiimide, which can include, for example, glycol ether acetate and/or xylene as the solvent. When combined and activated with heat, the reactive crosslinking monomer preferentially reacts with the hydroxyl and/or carboxyl groups of the thermoplastic polyurethane to crosslink the thermoplastic polyurethane with itself or with the active agent of the composition 42.

Specific formations of PVC and thermoplastic polyurethane materials and additives for preparing the composition 42 will now be described in further detail.

PVC Composition

In one of the above-described embodiments, the PVC composition 42 comprises a PVC polymer and at least one plasticizer, the plasticizer being reacted chemically with the carbodiimide reactive crosslinking monomer during gelling and fusing. In a preferred embodiment, the plasticizer selected for the present invention is also capable of reacting with the carbodiimide in the outer layer 26, so that the carbodiimide can successfully crosslink the polyurethane of the outer layer 26 with the plasticizer of the plastisol composition 42. Exemplary plasticizers include, without limitation, plasticizers having one or more pendent hydroxyl or carboxyl functional groups. These plasticizers are preferably incorporated around the backbone of the base polymer as an internal lubricant.

Preferably, both a low molecular weight plasticizer and a medium molecular weight plasticizer are included in the composition 42. The low molecular weight plasticizer is selected to provide low temperature flexibility, so that performance of the inner layer 28 at low temperatures, such as −30° C., is not hindered. An exemplary low molecular weight plasticizer is di-2-ethylhexylphthalate (also known as DUP). On the other hand, the medium molecular weight plasticizer is selected to provide high temperature stability to the inner layer 28. An exemplary medium molecular weight plasticizer is trioctyltrimellitate (TOTM).

The amount of low molecular weight plasticizer should be maintained fairly low so as to reduce volatilization and, consequently, window fogging. For example, the weight ratio of low molecular weight plasticizer to base resin in the composition 42 can be from about 0.25:100 to about 1:100. The weight ratio of medium molecular weight plasticizer to base resin in the composition 42 can be in a range of from about 10:100 to about 40:100, and more preferably in a range of from about 20:100 to about 40:100. If an insufficient amount of medium molecular weight plasticizer is used, the inner layer 28 may not exhibit adequate high temperature aging properties, resulting in, for example, premature stiffening of the inner layer 28 after exposure to elevated temperatures. On the other hand, if an excess amount of medium molecular weight plasticizer is used, the article surface may tend to gloss at elevated temperatures, creating unacceptable surface reflectance.

The PVC of the composition 42 can be prepared by any suitable technique, including suspension or mass polymerization followed by drying to provide a white, free-flowing powder of PVC having, for example, an average particle size of about 350 μm. The resulting PVC powder can then be thoroughly mixed with the plasticizer to form the PVC composition 42 by employing any suitable technique, such as high energy compounding. During compounding, the plasticizer is absorbed by the PVC and thereby causes the PVC to swell. Compounding can be performed, for example, at a temperature in a range of from about 150° F. (about 60° C.) to about 190° C. (about 88° C.).

The plasticizer selected should impart thermal stability to the PVC powder and be permanent to render the article flexible for life of the application. Generally, PVC powder consists of discrete particle groups that, when subjected to excessive temperatures, decompose prior to melting. This decomposition liberates hydrogen chloride, which autocatalytically degrades the PVC. Since the PVC is melted during the gelling and fusing steps (FIG. 6), a suitable internal plasticizer is mixed with and absorbed in the PVC powder prior to casting in order to inhibit thermal degradation of the PVC and provide the inner layer 28 with a soft, flexible, compressing feel.

Preferably, the plasticizer is bound in the PVC matrix with sufficient bond energy to form a permanent part of the polymer matrix and thereby permit the finished fused article to exhibit good flexibility and weathering at super- and sub-ambient conditions in use.

The PVC composition 42 can contain appropriate additives, including, by way of example and without limitation, any combination of the following: heat and ultra-violet light stabilizers, such as hydroquinones; internal lubricants, such as stearic acid; antioxidants; dulling agents; carbon black; and fillers, such as clay and/or diatomaceous earth. Other additives can also be introduced into the inner layer 28 to protect against oxidation and destabilization of the cast PVC. Such additives include barium, calcium, and zinc heat stabilizers, such as barium nonylphenate, calcium carboxylate, and zinc stearate. These and other additives can be included to form the dry resin material by using, by way of example and without limitation, a high intensity dry powder mixer such as a Henschel mixer.

In addition, the PVC composition 42 can comprise one or more copolymer alloys or blends of PVC and another polymer, such as one or more polyurethanes. Such copolymer alloys and blends can be prepared by techniques well known to those skill in the art, such as compounding.

Thermoplastic Polyurethanes

In another of the above-described embodiments, the composition 42 comprises a thermoplastic polyurethane containing at least one ethylenically unsaturated bond in its backbone and/or hydroxyl groups. The thermoplastic polyurethane may be non-aromatic or aromatic. In a preferred embodiment, the ethylenically unsaturated bond and/or hydroxyl groups of the thermoplastic polyurethane is/are capable of reacting with the carbodiimide in the outer layer 26, so that the carbodiimide can successfully crosslink the polyurethane of the outer layer 26 with the polyurethane of the composition 42. Exemplary thermoplastic polyurethanes include, without limitation, ESTANE (provided by B. F. Goodrich of Akron, Ohio) and PELLETHANE (provided by Dow Chemical Company of Midland Mich.).

The thermoplastic polyurethane of the composition 42 can be prepared by, for example, a prepolymerization technique, followed by drying, compounding, chopping, and grinding, to provide a free-flowing powder of thermoplastic polyurethane. Excess polyols can be provided in preparing the thermoplastic polyurethane of composition 42. As mentioned above, the hydroxyl groups of the excess polyols can serve to promote crosslinking and the chemical bonding between the outer layer 26 and the inner layer 28. The resulting thermoplastic polyurethane powder typically has a brownish appearance, and can possess, for example, a 425 mesh size. The powder can contain additives, as needed or required by the intended use, to form the composition 42 by employing any suitable technique, such as introducing the additives during prepolymerization. The weight ratio of the total additives to the base resin can be, for example, in a range of from about 3:100 to about 7:100, depending on the intended use and additives included.

The composition 42 can contain appropriate additives, including, by way of example and without limitation, any combination of the following: heat stabilizers; flexibilizers, such as low molecular weight polyurethanes (incorporated into the backbone, for example, during the compounding or like step); antioxidants; dulling agents; carbon black; fillers, such as clay particles; and free flowing additives. Other additives can also be introduced into the inner layer 28 to protect against scorching. These and other additives can be included to form the dry resin material by using, by way of example and without limitation, a high energy extruder/chopper.

Various blends of polyether polyols and polyisocyanates having suitable resilience properties-can be employed to form the semi-rigid polyurethane cellular foam of the intermediate layer 30. For example, the polyisocyanate blend can include methylene diisocyanate. The semi-rigid polyurethane cellular foam also can contain appropriate additives, including, by way of example and without limitation, any combination of the following: surfactants, antioxidants, fillers, stabilizers, catalysts such as tin catalysts (e.g., dibutyl tin dilaurate) and primary and secondary amines (e.g., diethanolamine), and small amounts of foaming agents such as water. In this regard, it is noted that the polyols and catalysts contain small amounts of water and it is typical to include a small amount in the formulation. The water reacts with the polyisocyanate to generate carbon dioxide and thereby impart the cellular structure to the intermediate layer 30. Accordingly, a slightly stoichiometric excess of polyisocyanate can be provided to form the semi-rigid polyurethane cellular foam.

The rigid substrate 22 can be selected from any material possessing the requisite strength to reinforce and mount the outer layer 26, inner layer 28, and intermediate layer 30. Suitable materials include any material with sufficient rigidity to permit the composite to be mounted into a vehicular sub-structure, including, by way of example, injection molded thermoplastics, such as, without limitation, a styrene maleic anhydride (SMA), acrylonitrile butadiene styrene (ABS), polycarbonates (PC), alloys of ABS-PC, reinforced reaction injection molded polyurethanes (RRIM), metals, metal alloys, wood-fiber composites, or any combination thereof.

Figure 2:
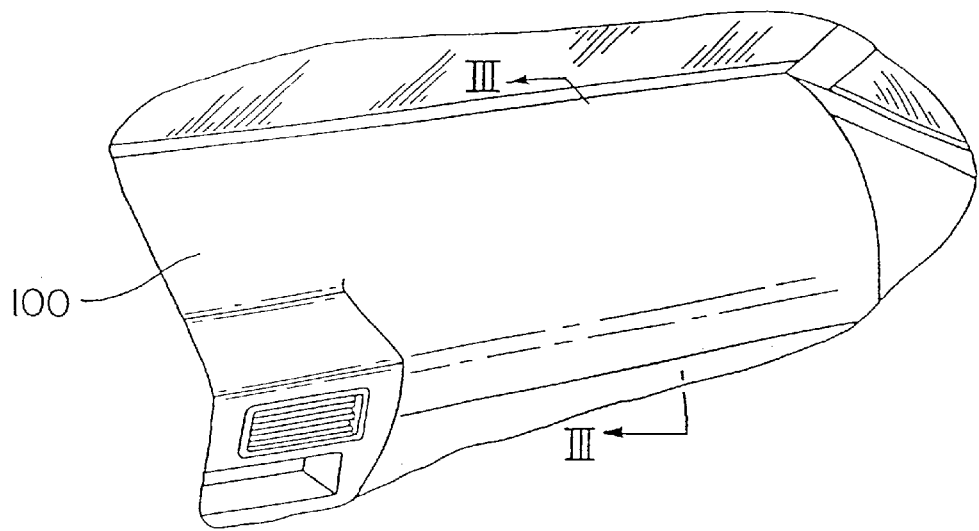
FIG. 2 is a perspective view of a completed vehicle instrument panel constructed in accordance with the present invention.
Figure 3:
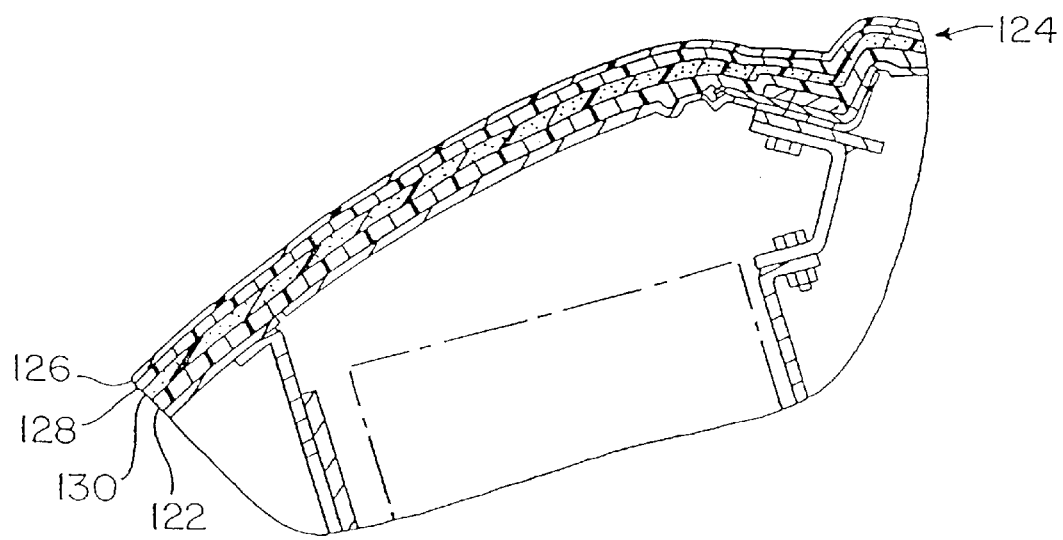
FIG. 3 is a sectional view of the instrument panel of FIG. 2 taken along line III—III.

Although the method of the present invention has been embodied above in connection with the preparation of a door panel, it is understood that the method is equally applicable to other panel-like structures, including for example instrument panels, armrests, headrests, floor consoles, knee bolsters, and glove compartment doors. An instrument panel prepared in accordance with the method of the present invention is illustrated in perspective and cross-sectional views in FIGS. 2 and 3, respectively, and is generally designated by reference numeral 100. The instrument panel 100 is shown in cross-section in FIG. 3, and includes a rigid substrate 122, an outer layer 126 and an inner layer 128 (collectively a layered composite structure, generally designated by reference numeral 124), and an intermediate layer 130.

The complete disclosures of any United States or foreign patents or patent applications mentioned or cited hereinabove are hereby incorporated by reference into the present specification.

The foregoing detailed description of the preferred embodiments of the invention has been provided for the purposes of illustration and description. It is not intended to be exhaustive or to limit the invention to the precise embodiments disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An article comprising a panel structure mountable in a vehicle to form part of the interior thereof, the structure having an exterior surface, at least a portion of which is exposed to the vehicle interior, and an interior surface which is hidden from the vehicle interior when the panel structure is mounted in the vehicle, said panel structure comprising:

a reinforcing substrate;

a layered composition structure comprising an outer layer defining at least a portion of said exterior surface of the panel structure and an inner layer, said layered composite structure being united to a surface of said reinforcing substrate so that said reinforcing substrate serves to reinforce said outer layer;

said outer layer comprising an at least substantially dried, light-stable, crosslinked polyurethane formulated from a water-dispersed composition comprising at least one coloring agent, at least one light-stable aliphatic thermoplastic polyurethane containing at least one pendent functional group selected from the group consisting of hydroxyl and carboxyl functional groups, and at least one heat-activated reactive crosslinking monomer or agent, said at least one light-stable aliphatic thermoplastic polyurethane being molded with and partially crosslinked by the heat-activated reactive crosslinking monomer or agent on a heated mold surface, said inner layer comprising poly(vinyl chloride), said poly(vinyl chloride) being formed directly on said outer layer by casting a composition comprising poly(vinyl chloride) containing at least one plasticizer onto an inner surface of said outer layer while on said mold surface such that unreacted functional groups of said at least one light-stable aliphatic thermoplastic polyurethane penetrates into said inner layer and reacts with said at least one plasticizer of said inner layer, thereby forming interfacial chemical bonding between said inner surface of said outer layer and an outer surface of said inner layer.

2. An article according to claim 1, wherein said heat-activated reactive crosslinking monomer or agent comprises carbodiimide.

3. An article according to claim 1, wherein the plasticizer contains one or more pendent hydroxyl, carboxyl, or hydroxyl and carboxyl functional groups.

4. An article according to claim 3, further comprising a polyurethane cellular foam interposed between said layered composite structure and said reinforcing substrate that adheres said layered composite structure to said reinforcing substrate, wherein said outer layer is provided with a compressing feel by said polyurethane cellular foam and said inner layer.

5. An article according to claim 4, wherein said outer layer has a thickness in a range of from about 1.0 mils to about 1.5 mils.

6. An article according to claim 4, wherein said inner layer has a thickness in a range of from about 40 mils to about 60 mils.

7. An article according to claim 4, wherein said light-stable aliphatic thermoplastic polyurethane and said heat-activated reactive crosslinking monomer or agent can be premixed and stably stored for at least up to 24 hours at room temperature.

8. An article according to claim 4, wherein said casting composition comprises at least two plasticizers of different molecular weights.

9. An article according to claim 4, wherein said poly(vinyl chloride) comprises a copolymer blend or alloy.

10. An article according to claim 4, wherein said panel structure is a door panel.

11. An article according to claim 4, wherein said panel structure is an instrument panel.

12. An article according to claim 1, wherein the water-dispersed composition has a water concentration of from about 10 wt % to about 80 wt %.

13. An article according to claim 12, wherein the water-dispersed composition has a solvent concentration of from about 9 wt % to about 15 wt %.

14. An article according to claim 13, wherein the solvent is N-methyl pyrrolidone.

15. An article according to claim 14, wherein the water-dispersed composition further comprises at least one member selected from the group consisting of glycol ether acetate and xylene.

* * * * *